US010273020B1

(12) United States Patent
Berckefeldt et al.

(10) Patent No.: US 10,273,020 B1
(45) Date of Patent: Apr. 30, 2019

(54) MOUNTING DEVICE ADAPTER AND METHOD IN A SYSTEM FOR DISPLAYING MISSION CRITICAL INFORMATION ON AN UNCERTIFIED DISPLAY

(71) Applicant: HONEYWELL INTERNATIONAL INC., Morris Plains, NJ (US)

(72) Inventors: Richard Berckefeldt, Paola, KS (US); Willard R. True, Kirkland, WA (US); Kalluri R. Sarma, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/920,155

(22) Filed: Mar. 13, 2018

Related U.S. Application Data

(60) Provisional application No. 62/595,623, filed on Dec. 7, 2017.

(51) Int. Cl.
F21V 3/12 (2018.01)
H04N 7/18 (2006.01)
B64D 43/00 (2006.01)
G06F 3/147 (2006.01)
H05B 33/12 (2006.01)
(Continued)

(52) U.S. Cl.
CPC ............... B64D 43/00 (2013.01); F21V 3/12 (2018.02); G06F 3/147 (2013.01); H05B 33/12 (2013.01); F21W 2111/00 (2013.01); G06F 3/04883 (2013.01); H04N 7/183 (2013.01)

(58) Field of Classification Search
None
See application file for complete search history.

(56) References Cited

U.S. PATENT DOCUMENTS 7,025,274 B2    4/2006    Solomon et al.
7,139,644 B2   11/2006    Bernard et al.
7,239,080 B2    7/2007    Ng et al.
(Continued)

FOREIGN PATENT DOCUMENTS

DE    102009046325 A1    5/2010
WO      2010045411 A1    4/2010

OTHER PUBLICATIONS

Miller, B., et al; Policy and Guidance for Electronic Flight Bag Class 1 & 2 System Architecture and Aircraft Connectivity; Federal Aviation Administration.

Primary Examiner — Thomas S McCormack
(74) Attorney, Agent, or Firm — Lorenz & Kopf, LLP

(57) ABSTRACT

A mounting apparatus configured to mount a personal electronic device (PED) in an aircraft flight deck and provide a visible indication on the PED display when a fault condition exists includes an optical sensor positioned to view the PED display and configured to record an image of the PED display; an optically transparent surface configured to be overlaid on the PED display; an actuatable covering on the surface wherein the actuatable covering has a first optically transparent state and a second optically emissive state; an excitation source configured to cause the covering to switch from the first state to the second state; and a controller configured to transmit an image of the PED display recorded by the optical sensor to a server and command, responsive to receipt of an enable signal from the server, the actuation source to actuate the covering to indicate that the fault condition exists.

20 Claims, 6 Drawing Sheets

(51) Int. Cl.
*F21W 111/00* (2006.01)
*G06F 3/0488* (2013.01)

(56) References Cited

U.S. PATENT DOCUMENTS

| | | | |
|---|---|---|---|
| 8,803,772 | B2 | 8/2014 | Kent et al. |
| 9,141,830 | B2 | 9/2015 | Uczekaj et al. |
| 9,158,115 | B1 * | 10/2015 | Worley .............. G02B 27/0172 |
| 9,337,953 | B1 | 5/2016 | Raghu et al. |
| 9,341,843 | B2 | 5/2016 | Border et al. |
| 9,583,008 | B2 | 2/2017 | Marion et al. |
| 9,714,081 | B1 | 7/2017 | Hall, III et al. |
| 2002/0039070 | A1 * | 4/2002 | Ververs ................. G01C 23/00 340/901 |
| 2004/0155186 | A1 | 8/2004 | Nestorovic et al. |
| 2006/0221022 | A1 | 10/2006 | Hajjar |
| 2007/0281734 | A1 | 12/2007 | Mizrachi |
| 2009/0058682 | A1 | 3/2009 | True |
| 2010/0110657 | A1 | 5/2010 | Weindorf |
| 2012/0140125 | A1 * | 6/2012 | Pepitone ............ G02B 27/0149 348/794 |
| 2013/0220841 | A1 | 8/2013 | Yang |
| 2013/0305391 | A1 | 11/2013 | Haukom et al. |
| 2013/0334545 | A1 | 12/2013 | Hu et al. |
| 2014/0262847 | A1 | 9/2014 | Yang |
| 2015/0029140 | A1 | 1/2015 | Hwang et al. |
| 2016/0122036 | A1 | 5/2016 | Athaway |
| 2016/0349933 | A1 | 12/2016 | Owczarski et al. |
| 2017/0195647 | A1 | 7/2017 | Honkanen et al. |
| 2017/0251501 | A1 | 8/2017 | Batsakes et al. |

* cited by examiner

MOUNTING DEVICE ADAPTER AND METHOD IN A SYSTEM FOR DISPLAYING MISSION CRITICAL INFORMATION ON AN UNCERTIFIED DISPLAY

CROSS-REFERENCE TO RELATED APPLICATION

This application claims priority to U.S. Provisional Application No. 62/595,623 filed Dec. 7, 2017. This application incorporates the provisional application into the present application by reference.

TECHNICAL FIELD

The present disclosure generally relates to display systems, and more particularly relates to display systems for displaying critical information on uncertified displays.

BACKGROUND

In many safety critical and/or regulated industries, such as avionics, maritime, rail, medical devices, nuclear, and others, display systems that display mission critical information may need to be certified that they can provide adequate integrity, continuity, and availability (ICA) for the mission critical information to be displayed thereon. The certification process may be costly and time-consuming and, therefore, may deter the implementation of new applications, such as new applications that use personal electronic devices (PEDs) to display mission critical information.

In the avionics industry, low-cost PEDs, such as tablet computers and smartphones, are being used for non-critical applications, such as charts and maps applications and weight and balance calculators. Operators may also want to have the freedom to display aeronautical information, such as airport moving maps, air traffic (Cockpit Display of Traffic Information or CDTI), advanced weather radar information, and others, on tablet computers instead of having to make costly modifications and upgrades to their existing avionics displays. Long-standing regulatory policy prohibits the display of critical aeronautical information during flight on uncertified displays because adequate integrity, continuity, and availability (ICA) cannot be assured.

Accordingly, it is desirable to provide a certifiable system for displaying critical information on uncertified displays or displays not approved for the display of data requiring high ICA. Furthermore, other desirable features and characteristics will become apparent from the subsequent detailed description, taken in conjunction with the accompanying drawings and the foregoing technical field and background.

SUMMARY

Systems and method are provided for allowing the use of uncertified displays to display mission critical information. In one embodiment, a mounting apparatus configured to mount a personal electronic device (PED) having a PED display in an aircraft flight deck and provide a visible indication on the PED display when a fault condition exists concerning the display of critical aeronautical information on the display is disclosed. The mounting adapter includes an optical sensor positioned to view the PED display and configured to record an image of the PED display; an optically transparent surface configured to be overlaid on the PED display; an actuatable covering on the surface wherein the actuatable covering has a first state wherein the covering is optically transparent and a second state wherein the covering is optically emissive; an excitation source configured to cause the covering to switch from the first state to the second state; and a controller configured to transmit an image of the PED display recorded by the optical sensor to a server and command, responsive to receipt of an enable signal from the server, the actuation source to actuate the covering to indicate that the fault condition exists.

In another embodiment, a method in a mounting apparatus configured to mount a personal electronic device (PED) having a PED display in an aircraft flight deck and provide a visible indication on the PED display when a fault condition exists concerning the display of critical aeronautical information on the display is provided. The method includes: transmitting an image of the PED display recorded by the optical sensor to a server; activating, responsive to receipt of an enable signal from the server, an actuation source in the mounting apparatus to excite an actuatable covering on an optically transparent surface overlaid on the PED display; exciting the actuatable covering to switch from an optically transparent first state to an optically emissive second state; and annunciating a message indicating that a problem exists with the image displayed on the PED display with the actuatable covering switched to the second state.

In another embodiment, a mounting adapter configured to facilitate the display of critical aeronautical information on a personal electronic device (PED) that is not certified for displaying critical aeronautical information is disclosed. The mounting adapter includes: a base configured to receive the PED and to securely mount the PED in an aircraft cockpit; and a lid configured to encase the PED within the base. The lid includes a film configured to be overlaid on a PED display wherein the film is arranged on the lid in a way that provides physical contact with the PED display when the lid is closed to allow for touch-gesture control and display action of the PED. The film includes a coating that is optically active in the presence of an excitation signal from an excitation source wherein upon application of the excitation signal the coating is configured to change state from normally optically transparent to optically emissive or opaque in a way that is visible in multiple lighting conditions encountered on an aircraft flight deck. The lid further includes a camera aimed in a manner to provide a view of the PED display and configured to record an image of the PED display. The lid further includes an excitation source that includes an optically emissive device trained on the film and configured to illuminate the optically reactive elements in the coating and activate the optically emissive qualities of the coating. The mounting adapter further includes an interface configured to transmit image information from the camera to a server and configured to transmit one or more signals from the server to the optically emissive device to command the optically emissive device to illuminate the coating to annunciate fixed or variable information as encoded in the coating.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
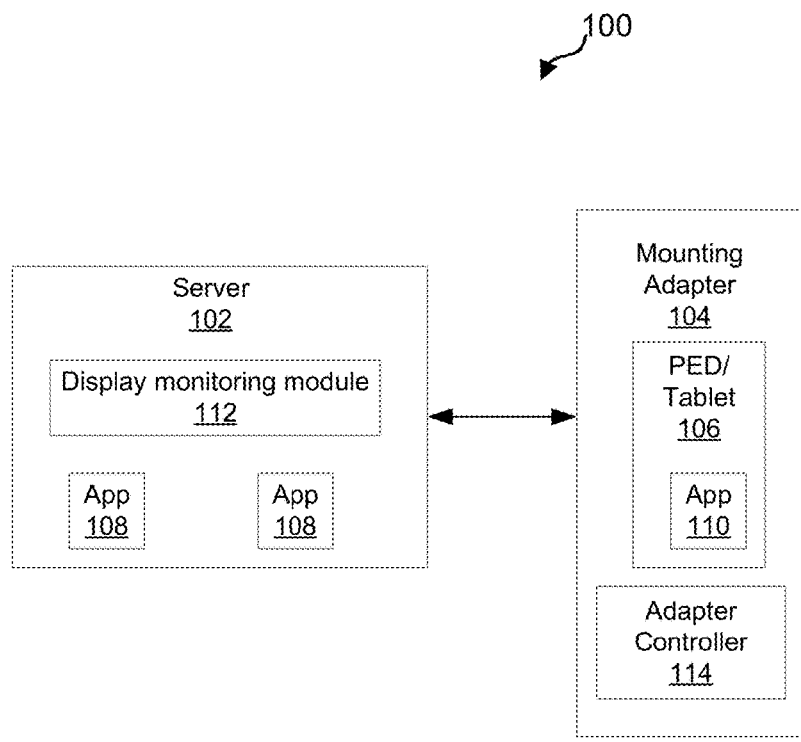
FIG. 1 is a block diagram depicting an example display system in an aircraft that allows uncertified display systems such as commercial PEDs to meet typical avionics requirements for the monitoring of ICA, in accordance with various embodiments.

The following detailed description is merely exemplary in nature and is not intended to limit the application and uses. References to aeronautical and/or aviation specific terms such as but not limited to "cockpit", "flight deck", "certification", or "aircraft" are for simplifying the description and are not intended to limit the application and uses to the aviation or aeronautical industry. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, methods, techniques and articles are described for providing assurance that an uncertified display, such as a display on a personal electronic device (PED) (e.g., a tablet computer, a smartphone, or some other device), that is used to display mission critical data (e.g., critical aeronautical information) accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. Loss of accuracy or ICA can be annunciated to operators (e.g., a flight crew) of the uncertified display without reliance on the uncertified display to self-report the loss when displaying the mission critical data.

In the case of aeronautical applications, the apparatus, systems, methods, techniques and articles described herein may allow operators to use a PED to display critical aeronautical information. This may allow for a more affordable and quicker adoption of new avionics functionality. The described apparatus, systems, methods, techniques and articles may allow for mission critical data such as that generated by multiple high integrity applications (e.g. airborne situational awareness (AIRB) and various other CNS-ATM (Communications Navigation and Surveillance—Air Traffic Management) applications such as flight deck interval management (FIM) or air traffic control controller/pilot data link communication (CPDLC), SURF (Surface Surveillance application that includes an airport moving map with traffic superimposed), and others) to be displayed on uncertified displays. At the same time, the described apparatus, systems, methods, techniques and articles can allow data from lower integrity applications, such as maps and charts, to be displayed on the uncertified displays without changes to the applications or equipment installation.

In the description that follows, example clamshell mounting device embodiments are provided. The described mounting device embodiments may provide a mechanical capture and mounting mechanism for mounting a PED, such as a tablet computer, on an aircraft flight deck and host ICA monitoring and annunciation functionality. The described mounting device embodiments may be easy to install on the flight deck as a part of an STC (Supplemental Type Certificate—an FAA regulatory approval to modify an aircraft to incorporate specific equipment, software, or functionality). The described mounting device embodiments may make it easy for the flight crew to install commercial tablet computers or smartphones with a wired connector (e.g., a lightning cable or USB connector) or, alternatively, a wireless connection (e.g., Wi-Fi, Bluetooth, near-field communication (NFC), or other wireless communication methods). The described mounting device embodiments should not interfere with normal operations of the PED. The described mounting device embodiments should support normal touchscreen functionality and optical display functionality of the PED.

FIG. 1 is a block diagram depicting an example system 100 that allows an uncertified display system, such as a PED, to meet typical avionics requirements for the monitoring of ICA. The example system 100 includes an application server 102 and a mounting adapter 104 configured to mount a PED 106 (having a PED display) in an aircraft flight deck or cockpit.

The example application server 102 includes at least one processor and a computer-readable storage device or media encoded with programming instructions for configuring the at least one processor. The example application server 102 is positioned in an aircraft. The example application server 102 is a fully certified avionics box that hosts and executes one or more high integrity avionics application modules 108. The high integrity avionics application modules 108 are configured to generate mission critical data (e.g., critical aeronautical information) for display on a cockpit display. The example application server 102 is configured to transmit the generated critical aeronautical information to an uncertified cockpit display (e.g., the PED 106) for display (e.g., on the PED display).

The example application server 102 also includes a display monitoring module 112 that is configured to monitor the image displayed on an uncertified cockpit display when critical aeronautical information is transmitted from a high integrity avionics application module 108 to the uncertified cockpit display device (e.g., PED 106) to determine whether a problem exists with the display of the mission critical data on the uncertified display device. The example display monitoring module 112 is configured to determine whether a problem exists with the display of the mission critical data on the uncertified display device 106 by verifying the integrity, continuity, and availability (ICA) of the mission critical data displayed on the uncertified display device 106. The example display monitoring module 112 is also configured to cause the annunciation of a message indicating that a problem exists with the display of mission critical data on the uncertified display device 106, when it determines that a problem indeed exists.

The mounting adapter 104 is configured to mount an uncertified display device 106 in an aircraft cockpit for use by a flight crew so that the uncertified display device 106 may display critical or non-critical aeronautical information to the flight crew. When the uncertified display device 106 comprises a tablet computer, the mounting adapter 104 may include a clamshell shape to fully enclose the tablet computer 106.

The example uncertified display device 106 may comprise a PED (such as a tablet computer, a smartphone, or some other device), which includes at least one processor and computer readable media, and is configured to host and execute one or more application programs such as a specialized avionics display application 110. The example specialized avionics display application 110 is configured to display critical aeronautical information received by the PED 106 from the application server 102.

The example mounting adapter 104 further includes an adapter controller 114. The example controller 114 includes at least one processor and computer readable media. In other embodiments, the adapter controller 114 may not include a processor. The example controller 114 is configured (for example by programming instructions) to transmit images of the display on the uncertified display device 106 to the display monitoring module 112 and to activate the annunciation of a message indicating that a problem exists with the display of mission critical data on the uncertified display device 106, when the display monitoring module 112 determines that a problem exists.

Figure 2:
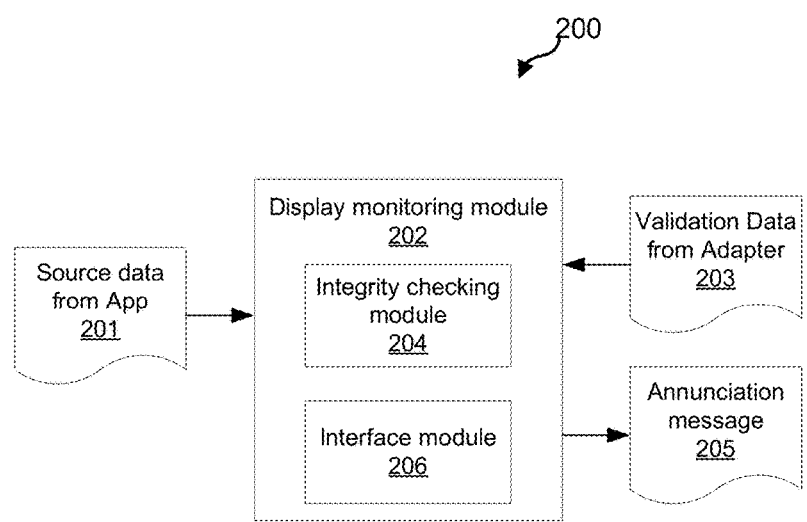
FIG. 2 is a block diagram depicting an example display monitoring module in an example server, in accordance with various embodiments.

FIG. 2 is a block diagram depicting an example display monitoring module 202 in a server 200 wherein the example display monitoring module provides a way to display critical aeronautical information on an aircraft display that is not certified for displaying critical aeronautical information. The example display monitoring module includes an integrity checking module 204 and an interface module 206. All or parts of the example display monitoring module may be incorporated in an application module (e.g., application module 108 from FIG. 1) or separate from the application module.

The integrity checking module 204 is configured to compare source data 201 (e.g., critical aeronautical information) received by the display monitoring module 202 from a high integrity avionics application (e.g., high integrity avionics application module 108 from FIG. 1) to validation data 203 (which includes PED image information) received by the display monitoring module 202 from a monitoring adapter (e.g., mounting adapter 104 from FIG. 1). The integrity checking module 204 is configured to compare the source data 201 to the validation data 203 to determine whether a problem exists with the display of mission critical data on the uncertified display device (e.g., PED 106 from FIG. 1). The example integrity checking module 204 is configured to determine whether a problem exists with the display of mission critical data on the uncertified display device (e.g., PED 106) by verifying the ICA of the mission critical data displayed on the uncertified display device (e.g., PED 106).

The interface module 206 is configured to communicate an annunciation message 205 (e.g. a loss of ICA) to the mounting adapter (e.g., mounting adapter 104 from FIG. 1) that instructs the mounting adapter to annunciate a message indicating that a problem exists with the display of mission critical data on the uncertified display device, when the integrity checking module 204 determines that a problem does exist with the display of the mission critical data.

Figure 3:
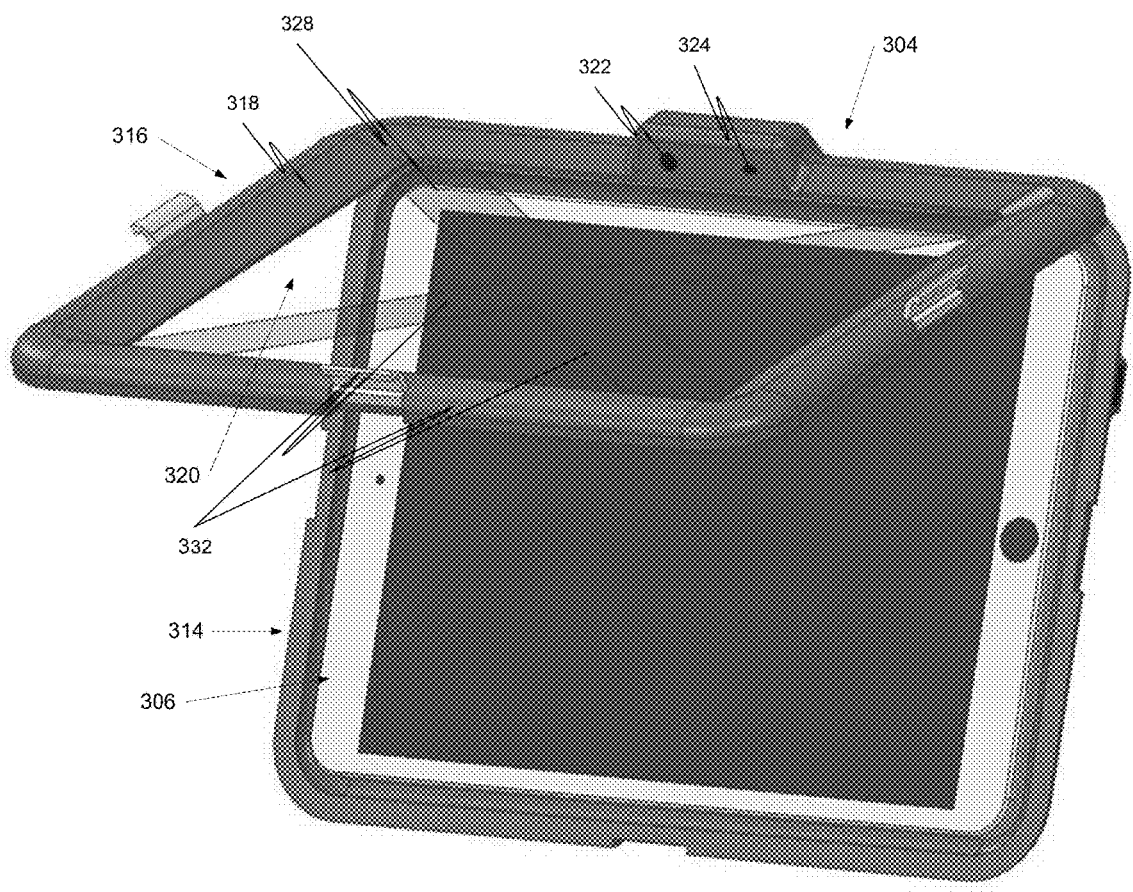
FIG. 3 is a simplified perspective view of an example PED mounting adapter, in accordance with various embodiments.

FIG. 3 is a simplified perspective view of an example mounting adapter 304. The example mounting adapter 304 incorporates a clamshell design configured to mechanically capture a PED/tablet 306 and mount the display assembly (which includes the mounting adapter and the PED) in the aircraft flight deck or cockpit.

The example mounting adapter 304 includes a base or back 314 and a lid, cover, or front 316. The example base or back 314 is configured to be slightly larger than the outline of the tablet 306 to be mounted and may have threaded mounting bosses on the back to facilitate installation of the mounting adapter 304 in the aircraft. The example base 314 may also host multiple electrical wiring necessary to provide power and data exchange with the server 302.

The example mounting adapter 304 is also configured with a lid 316 that may be closed over the top of the tablet 306 to fully enclose the tablet 306 within the mounting adapter 304. The example lid 316 includes a bezel 318, a surface 320 (e.g., an optically and capacitively transparent film), an optical imaging device 322 (e.g., a camera), and an actuation source 324 (e.g., optically emissive devices).

The example bezel 318 is attached to the base 314 by hinges (not shown) or other mechanical means and closes around the tablet 306 to mechanically capture the tablet 306. The example bezel 318 also hosts the optically and capacitively transparent film 320, the optical imaging device 322, and the optically emissive devices 324.

The example optically and capacitively transparent film 320 is attached to the bezel 318 in a way that provides it physical contact with the tablet display when the lid 316 is closed to allow for normal touch-gesture control and display action of the tablet 306. Further, the example film 320 has special properties such as an actuatable covering 328 (e.g., a special coating) with applied or embedded nanoparticles which are optically active in the presence of an excitation source such as electrical voltage or current or coincident optical or near-optical radiation (such as ultraviolet light).

Upon application of the appropriate excitation signal, the covering 328 changes state from normally optically transparent to optically emissive or opaque in a way that is easily visible to an operator in multiple lighting conditions encountered on a flight deck.

An imaging device 322, such as a small camera (e.g., a camera similar to one that might be included in a smart phone), can be mounted or embedded on/in the bezel 318 of the lid 316 and aimed in a manner to provide for maximum view of the tablet display. More than one imaging device 322 may be used or a corrective lens (not shown) may be applied to compensate for the extremely oblique viewing angle the imaging device 322 may have with the tablet's display. The viewing angle of the imaging device(s) 322 may be enhanced or augmented by the use of lenses to optimize the image quality.

An actuation source 324, such as optically emissive devices (e.g., LEDs (light-emitting diodes) operating in a non-visible light band) may be located on the bezel and trained on the cover film 320 to illuminate the film's coating and activate its optical qualities. The LEDs, in some embodiments, may produce light in the UV-A band (320-400 nm) and, in some embodiments, may produce light at 385 nm for the color red. Other optically reactive technology, such as MEMS (Microelectromechanical systems) scanners and laser diodes, may alternatively be located on the bezel and trained on the cover film 320 to illuminate the film's coating and activate its optical qualities. Alternatively, if the actuatable covering 328 can be activated by an electrical signal, then the optically emissive devices 324, MEMS scanners, and laser diodes would not be needed in the bezel.

The example mounting adapter 304 further includes an adapter controller (not shown). The adapter controller is configured to transmit images from the display on the PED 306 to an application server (e.g., server 102 from FIG. 1), receive messages from the server indicating that a problem exists with the display of mission critical data on the tablet display (e.g. a loss of ICA), and cause the actuation source 324 to actuate the covering 328 to annunciate a message indicating that a problem exists with the display of mission critical data on the tablet display, when the server determines that a problem exists with the display of the mission critical data.

Figure 4:
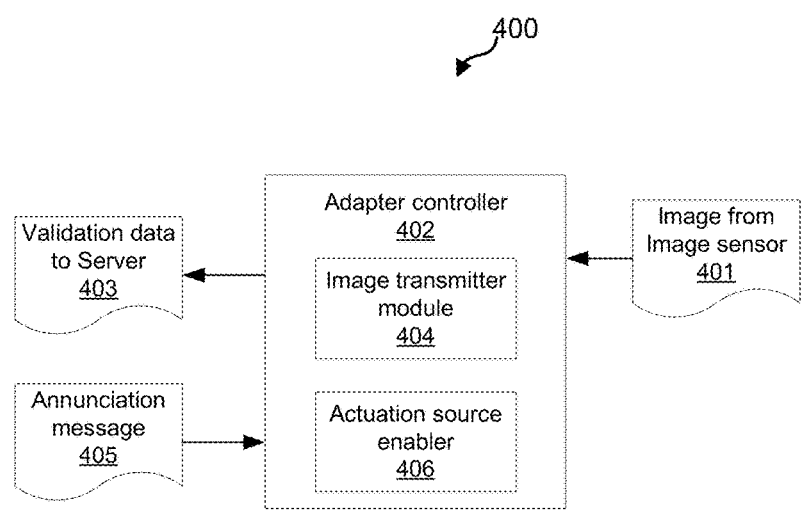
FIG. 4 is a block diagram depicting an example adapter controller in an example PED mounting adapter, in accordance with various embodiments.

FIG. 4 is a block diagram depicting an example adapter controller 402 in a mounting adapter 400. The example adapter controller includes an image transmitter module 404 and an actuation source enabler 406. The example adapter controller 402 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. In other embodiments, the adapter controller 402 may not include a processor.

The example image transmitter module 404 is configured to retrieve an image 401 of the PED display from an imaging sensor (e.g., imaging sensor from imaging device 322 from FIG. 3) and transmit validation data 403 (which includes image information from the PED display) to an application server (e.g., server 102 from FIG. 1). The example actuation source enabler 406 is configured to receive an annunciation message 405 from the server indicating that a problem exists with the display of mission critical data on the PED display (e.g. a loss of ICA), and cause an actuation source (e.g., actuation source 324 from FIG. 3) to actuate the covering 328 to annunciate a message indicating that a problem exists with the display of mission critical data on the PED display, when the server determines that a problem exists with the display of the mission critical data.

Referring again to FIGS. 1 and 3, the example system 100 may function as follows. An avionics application 108 such as a CDTI may execute on the server 102 while an avionics display application 110 executes on the tablet 106 or 306. The tablet 106 or 306 is enclosed in the mounting adapter 104 or 304 which is mounted on the flight deck in a suitable location (e.g., on the outboard side of the crew's seats). The mounting adapter 104 or 304 may be connected to the server 102 by several bus wires, such as a bi-directional data bus which allows for information exchanges between the tablet 106 or 306 and the server 102 (and perhaps supplies power to the tablet), a bus to carry video information from the imaging device 322 to the server 102, and a signal or power bus from the server 102 to the actuation source 324. The mounting adapter 104 or 304 may be additionally differentiated from commercially available tablet cases in that it may be qualified for aviation use by providing mechanical and electrical protection for the tablet 106 or 306 and the aircraft by being qualified according to RTCA DO-160(x).

The example system 100 can allow uncertified display devices such as PEDs/tablets 106 or 306 to display critical aeronautical information by performing two functions: ICA monitoring and providing crew annunciation of non-nominal ICA status.

ICA monitoring may be accomplished in two layers as follows. The avionics application 108 executing on the server will determine what information/images need to be displayed on the tablet 106 and will encode (e.g., using HTML5) and transmit that information to the avionics display application 110 executing on the tablet 106 or 306. In the first layer, prior to displaying any of this information, the avionics display application 110 will decode the information to be displayed and re-encode it in a dis-similar protocol and "echo back" the information to the server 102, which will compare the echo-back information with the information originally sent. Matching information will result in an "ack" (acknowledgement) from the server to the tablet while a mismatch would generate a "no-ack" and a crew annunciation. This first layer provides for monitoring the ICA to the avionics display application 110 but does not provide for monitoring the link between the avionics display application 110 and the physical display.

In the second layer, the system may monitor the actual information displayed on the screen via the imaging device (e.g., image sensor) 322 mounted on the bezel 318. As an example, monitoring may include monitoring all aspects of the display (color and location of every pixel) or using a sampling scheme where the probability of detecting loss of ICA is equivalent or better to the requirements of the Hazard Classification of the application. Thus, the monitoring rigor can be tailored to the criticality of the application. Sampling schemes could be further simplified by using specific patterns like QR codes which are displayed for a few milliseconds (faster than the time it takes for the human eye to perceive) on the display and may be customized for optimal recognizability by the image device 322 (e.g., a keystone shape). The codes could be randomly changed in content, location, and timing to add robustness to the sampling scheme. In any case, the optical information imaged by the image sensor (e.g., imaging sensor from imaging device 322) is sent back to the server 102 to enable the software application 108 to compare the image detected to what it expected to see based on what it sent to the PED 106 or 306 for display. If a loss of ICA is detected, the server 102/application 108 would activate the appropriate annunciation.

If the server 102/application 108 determines that there has been a loss of ICA, it can activate an annunciation by asserting the appropriate electrical signal on the output bus to activate the coating on the cover film 320 of the tablet mounting adapter 104. As an example, the annunciation might simply put a red 'X' 332 over the display if a failure was detected. An 'X' character could be coated onto the cover film 320. Other more sophisticated (but fixed) imagery or text could (also or alternatively) be coated onto the cover film including one or more textual failure messages. In addition, a fail-condition may also result in the sending of display information to an alternate location such as a different tablet.

Annunciation may be accomplished as follows. The film 320 and covering 328 provides the overall system with the ability to annunciate fixed or variable information to the crew as encoded in the covering 328 or other optically reactive elements. Signal inputs from the server 102 may be used to activate the optical covering 328. The activation may be electrical, similar to the way an LCD is activated, by the application of a voltage across the breadth of the coating.

The activation may also be accomplished by illuminating the coating with a selective bandwidth of emitted light. In this example, light emitting elements such as discrete LEDs may be designed into the bezel of the lid and aimed toward the coating on the film. The LEDs would be energized by a signal or signals from the server and would then illuminate the coating in a flood pattern. The coating would be activated by the illumination provided by the LEDs and would change state to be clearly visible to the crew. The spectrum of light required to activate the coating would be selected to use light not typically found on flight decks either from natural or artificial light to avoid un-commanded activation of the coating.

An alternate implementation would use illumination devices such as laser diodes where the laser light is directed to specifically intended locations by means of providing coordinates from the server to a MEMS Scanner which would direct the excitation light to those intended locations on the cover film. This technique may employ a stroke or raster scan pattern which allows characters or images to be displayed on the cover film.

Figure 5:
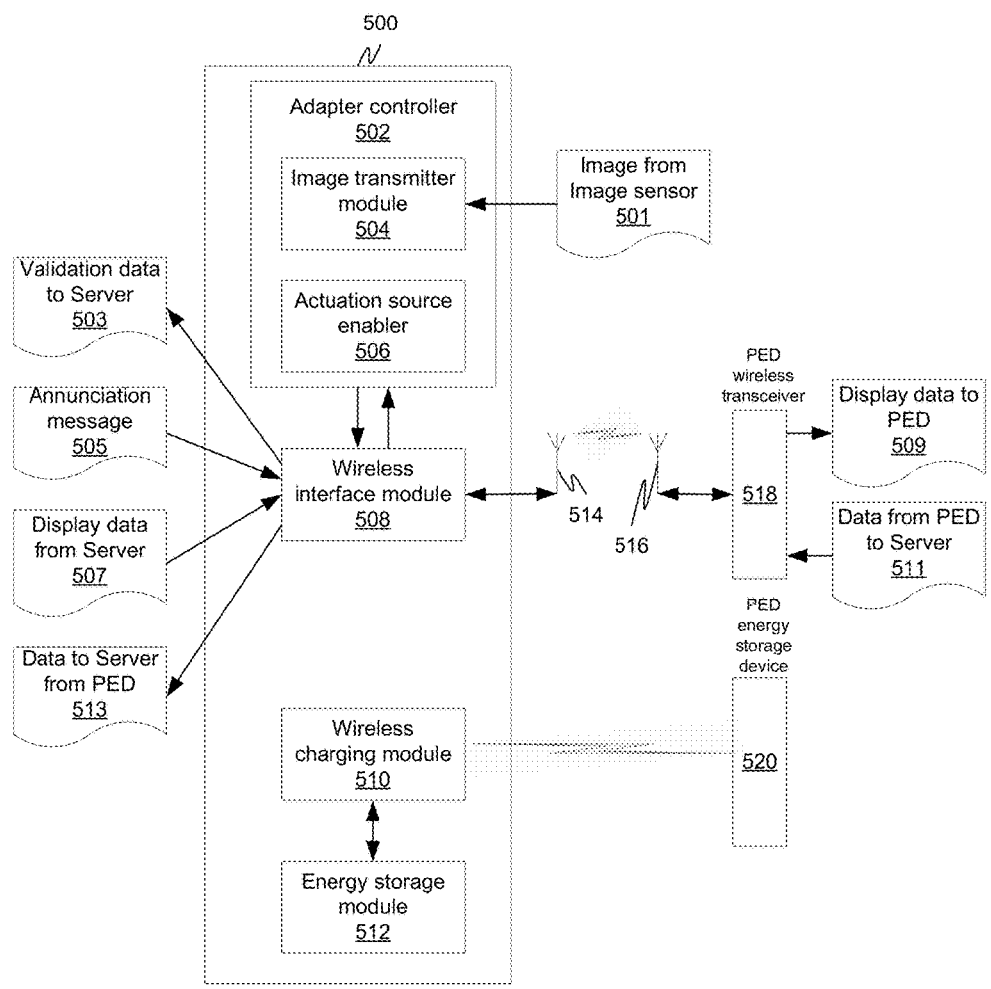
FIG. 5 is a block diagram depicting example communication and power modules in an example mounting adapter, in accordance with various embodiments.

FIG. 5 is a block diagram depicting example communication and power modules in an example mounting adapter 500. The example mounting adapter 500 includes an adapter controller 502, a wireless interface module 508, a wireless charging module 510, and an energy storage module 512.

The example adapter controller 502 includes an image transmitter module 504 and an actuation source enabler 506. The example adapter controller 502 includes at least one processor and a computer-readable storage device or media encoded with programming instructions for configuring the controller. The example image transmitter module 504 is configured to retrieve an image 501 of the PED display from an imaging sensor (e.g., imaging sensor from imaging device 322 from FIG. 3) and transmit validation data 503 (which includes image information from the PED display) to an application server (e.g., server 102 from FIG. 1). The example actuation source enabler 506 is configured to receive an annunciation message 505 from the server indicating that a problem exists with the display of mission critical data on the PED display (e.g. a loss of ICA), and cause an actuation source (e.g., actuation source 324 from FIG. 3) to actuate the covering 328 to annunciate a message indicating that a problem exists with the display of mission critical data on the PED display, when the server determines that a problem exists with the display of the mission critical data.

The example wireless interface module 508 is configured to provide an interface between the application server (e.g., server 102 from FIG. 1) and the mounting adapter 500. The example wireless interface module 508 is also configured to provide an interface between the application server and the PED (e.g., PED 106 or 306).

The example wireless interface module 508 may communicate with the application server (e.g., server 102) via several bus wires, such as a bi-directional data bus which allows for information exchanges (e.g., display data 507 from the server to be displayed on the PED, and data 513 sent to the server from the PED) between the wireless interface module 508 and the server (and perhaps supplies power), a bus to carry video information (e.g., validation data 503) from the image transmitter module 504 to the server 102, and a signal or power bus to carry an annunciation message 505 from the server 102 to the actuation source enabler 506.

The example wireless interface module 508 may, alternatively or additionally, communicate wirelessly with the application server using wireless techniques, such as Wi-Fi, Bluetooth, near-field communication, or others, for information exchanges with the server. The information exchanges may include the transfer of display data 507 from the server to be displayed on the PED, data 513 sent to the server from the PED, validation data 503 from the image transmitter module 504 to the server 102, and an annunciation message 505 from the server 102 to the actuation source enabler 506.

The example wireless interface module 508 is configured to communicate wirelessly with an installed PED (e.g., tablet computer, smartphone, or other device) using the wireless communication methodology that the PED is configured to use. The example wireless interface module 508 may communicate wirelessly with the PED via an antenna 514 (that is internal to or external to the module 508) and an antenna 516 associated with a PED wireless transceiver 518 to exchange data (e.g., display data 507 from the server to be displayed on the PED, and data 513 sent to the server from the PED). The communication methodology employed may include Wi-Fi, Bluetooth, near-field communication, or others. Because of the close proximity between the wireless interface module antenna 514 in the mounting adapter 500 and a PED antenna 516 when the PED is installed in the mounting adapter 500, the wireless communication link between the example wireless interface module 508 and the PED may be low-power. A technical advantage that may be attained with a low-power wireless communication link is that the wireless communication link would be less likely to cause interference with other avionics systems on an aircraft.

The example wireless charging module 510 is configured to provide wireless charging (e.g., inductive charging or cordless charging) to the PED. In one embodiment, the example wireless charging module 510 is configured to use an electromagnetic field to transfer energy to the PED through electromagnetic induction. Energy can be sent through an inductive coupling to the PED, which can then use that energy to charge an energy storage device 520 (such as a battery) and/or operate. Because of the close proximity between the PED mounted in the mounting adapter 500 and the example wireless charging module 510 in the mounting adapter 500, an induction coil in the wireless charging module 510 and an induction coil in the PED can combine to form an electrical transformer to transfer energy from the wireless charging module 510 to the PED. In other embodiments, other wireless charging methodologies may be employed.

The example energy storage module 512 is configured to provide energy storage capabilities to the mounting adapter 500. The example energy storage module 512 may comprise one or more batteries, capacitive storage devices, and/or other energy storage devices. The example energy storage module 512 may be used to provide primary and/or backup power to various modules in the mounting adapter 500 including the wireless charging module 510, the wireless interface module 508, and/or the adapter controller 502 (and the modules provided by the adapter controller 502).

The example wireless charging module 510, energy storage module 512, and the adapter controller may receive power via a wired connection to a connected server (e.g., server 102) or other aircraft systems. Energy may also be provided wirelessly to the energy storage module 512, which can store the energy and use the stored energy to provide power to other devices in the mounting adapter 500 including the wireless charging module 510 and the adapter controller 502.

Figure 6:
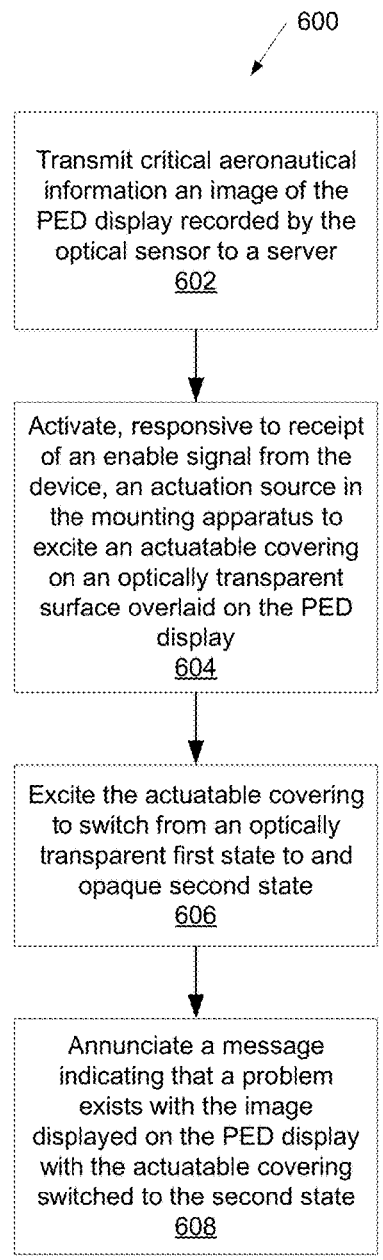
FIG. 6 is a process flow chart depicting an example process in a mounting apparatus configured to mount a PED having a PED display in an aircraft flight deck and provide a visible indication on the PED display when a fault condition exists concerning the display of critical aeronautical information on the display, in accordance with various embodiments.

FIG. 6 is a process flow chart depicting an example process 600 in a mounting apparatus configured to mount a PED having a PED display in an aircraft flight deck and provide a visible indication on the PED display when a fault condition exists concerning the display of critical aeronautical information on the display. In various embodiments, the process can be scheduled to run based on one or more predetermined events, and/or can run continuously during operation of the aircraft.

The example process 600 includes transmitting an image of the PED display recorded by the optical sensor to a server (operation 602). The optical sensor may be arranged in a camera.

The example process 600 includes activating, responsive to receipt of an enable signal from the server, an actuation source in the mounting apparatus to excite an actuatable covering on an optically transparent surface overlaid on the PED display (operation 604). The surface with the actuatable covering may include a film that is overlaid on the PED display wherein the film includes a coating that is optically active in the presence of an excitation source. The actuation source may include an excitation source that is configured to activate the optically active coating. The excitation source may include an optically emissive device.

The example process 600 also includes exciting the actuatable covering to switch from an optically transparent first state to an optically emissive second state (operation 606). The actuation source may include an electrical source configured to deliver an electrical signal to the actuatable covering to excite the actuatable covering to switch from the first state to the second state. The actuation source may include an optically emissive device trained on the actuatable covering and configured to illuminate optically reactive elements in the actuatable covering to excite the actuatable covering to switch from the first state to the second state. The optically emissive device may include a UV LED configured to illuminate the optically reactive elements in the actuatable covering.

The example process 600 also includes annunciating a message indicating that a problem exists with the image displayed on the PED display with the actuatable covering switched to the second state (operation 608). Annunciating a message may include displaying a visible symbol that indicates that a problem exists with the image displayed on the PED display. The visible symbol may be displayed in a color that indicates that a problem exists with the image displayed on the PED display. The color may be red and the symbol may be an X. Annunciating a message may additionally or alternatively include displaying text that indicates that a problem exists with the image displayed on the PED display.

In one embodiment, a mounting apparatus configured to mount a personal electronic device (PED) having a PED display in an aircraft flight deck and provide a visible indication on the PED display when a fault condition exists concerning the display of critical aeronautical information on the display is disclosed. The mounting adapter comprises an optical sensor positioned to view the PED display and configured to record an image of the PED display; an optically transparent surface configured to be overlaid on the PED display; an actuatable covering on the surface wherein the actuatable covering has a first state wherein the covering is optically transparent and a second state wherein the covering is optically emissive; an excitation source configured to cause the covering to switch from the first state to the second state; and a controller configured to transmit an image of the PED display recorded by the optical sensor to a server and command, responsive to receipt of an enable signal from the server, the actuation source to actuate the covering to indicate that the fault condition exists.

These aspects and other embodiments may include one or more of the following features. The mounting apparatus may further comprise: a base configured to receive the PED and securely mount the PED on the aircraft flight deck; and a lid configured to encase the PED in cooperating with the base when in a closed position, wherein the optically transparent surface is positioned within the lid, and wherein when the lid is in the closed position the transparent surface is positioned in contact with the PED display to allow for touch-gesture control and display action of the PED. The optical sensor may be positioned within the lid. The actuation source may be positioned within the lid. The optical sensor may be arranged in a camera. The actuatable covering on the surface may comprise an activatable coating on an optically and capacitively transparent film, wherein the coating is optically active in the presence of an excitation signal from the excitation source. The excitation source may comprise an electrical source configured to deliver an electrical signal to the coating on the film to activate the coating to switch from the first state wherein the coating is optically transparent to the second state wherein the coating is optically emissive. The excitation source may comprise an optically emissive device trained on the film and configured to illuminate optically reactive elements in the coating to activate the coating to switch from the first state wherein the coating is optically transparent to the second state wherein the coating is optically emissive. The optically emissive device may comprise an LED (light-emitting diode) operating in a non-visible light band and configured to illuminate the coating on the film. The coating when activated may be configured to display a visible symbol that indicates that a problem exists with the image displayed on the PED display. The coating when activated may be configured to display the visible symbol in a color that indicates that a problem exists with the image displayed on the PED display. The color may be red and the symbol may be an X. The coating when activated may be configured to display text that indicates that a problem exists with the image displayed on the PED display. The PED may comprise a general-purpose tablet computer or a smartphone. The mounting apparatus may further comprise a wireless interface module configured to communicate wirelessly with the PED using a wireless communication methodology employed by the PED to transfer data between the server and the PED. The mounting apparatus may further comprise a wireless charging module configured to transfer energy to the PED via wireless charging. The mounting apparatus may further comprise an energy storage module configured to store energy and provide stored energy to the wireless charging module.

In another embodiment, a method in a mounting apparatus configured to mount a personal electronic device (PED) having a PED display in an aircraft flight deck and provide a visible indication on the PED display when a fault condition exists concerning the display of critical aeronautical information on the display is provided. The method comprises: transmitting an image of the PED display recorded by the optical sensor to a server; activating, responsive to receipt of an enable signal from the server, an actuation source in the mounting apparatus to excite an actuatable covering on an optically transparent surface overlaid on the PED display; exciting the actuatable covering to switch from an optically transparent first state to and optically emissive second state; and annunciating a message indicating that a problem exists with the image displayed on the PED display with the actuatable covering switched to the second state.

These aspects and other embodiments may include one or more of the following features. Annunciating a message may comprise displaying a visible symbol that indicates that a problem exists with the image displayed on the PED display. Displaying a visible symbol may comprise displaying the visible symbol in a color that indicates that a problem exists with the image displayed on the PED display. The color may be red and the symbol may be an X. Annunciating a message may comprise displaying text that indicates that a problem exists with the image displayed on the PED display.

In another embodiment, a mounting adapter configured to facilitate the display of critical aeronautical information on a personal electronic device (PED) that is not certified for displaying critical aeronautical information is disclosed. The mounting adapter comprises: a base configured to receive the PED and to securely mount the PED in an aircraft cockpit; and a lid configured to encase the PED within the base. The lid includes a film configured to be overlaid on a PED display wherein the film is arranged on the lid in a way that provides physical contact with the PED display when the lid is closed to allow for touch-gesture control and display action of the PED. The film includes a coating that is optically active in the presence of an excitation signal from an excitation source wherein upon application of the excitation signal the coating is configured to change state from normally optically transparent to optically emissive or opaque in a way that is visible in multiple lighting conditions encountered on an aircraft flight deck. The lid further includes a camera aimed in a manner to provide a view of the PED display and configured to record an image of the PED display. The lid further includes an excitation source comprising an optically emissive device trained on the film and configured to illuminate the optically reactive elements in the coating and activate the optically emissive qualities of the coating. The mounting adapter further comprises an interface configured to transmit image information from the camera to a server and configured to transmit one or more signals from the server to the optically emissive device to command the optically emissive device to illuminate the coating to annunciate fixed or variable information as encoded in the coating.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A mounting apparatus configured to mount a personal electronic device (PED) having a PED display in an aircraft flight deck and provide a visible indication on the PED display when a fault condition exists concerning the display of critical aeronautical information on the display, the mounting adapter comprising:
   an optical sensor positioned to view the PED display and configured to record an image of the PED display;
   an optically transparent surface configured to be overlaid on the PED display;
   an actuatable covering on the surface, the actuatable covering having a first state wherein the covering is optically transparent and a second state wherein the covering is optically emissive;
   an excitation source configured to cause the covering to switch from the first state to the second state; and
   a controller configured to transmit an image of the PED display recorded by the optical sensor to a server and command, responsive to receipt of an enable signal from the server, the actuation source to actuate the covering to indicate that the fault condition exists.

2. The mounting apparatus of claim 1, further comprising:
   a base configured to receive the PED and securely mount the PED on the aircraft flight deck; and
   a lid configured to encase the PED in cooperating with the base when in a closed position, wherein the optically transparent surface is positioned within the lid, wherein when the lid is in the closed position the transparent surface is positioned in contact with the PED display to allow for touch-gesture control and display action of the PED.

3. The mounting apparatus of claim 2, wherein the optical sensor and the actuation source are positioned within the lid.

4. The mounting apparatus of claim 1, wherein the optical sensor is arranged in a camera.

5. The mounting apparatus of claim 1, wherein the actuatable covering on the surface comprises an activatable coating on an optically and capacitively transparent film, wherein the coating is optically active in the presence of an excitation signal from the excitation source.

6. The mounting apparatus of claim 5, wherein the excitation source comprises an electrical source configured to deliver an electrical signal to the coating on the film to activate the coating to switch from the first state wherein the coating is optically transparent to the second state wherein the coating is optically emissive.

7. The mounting apparatus of claim 5, wherein the excitation source comprises an optically emissive device trained on the film and configured to illuminate optically reactive elements in the coating to activate the coating to switch from the first state wherein the coating is optically transparent to the second state wherein the coating is optically emissive.

8. The mounting apparatus of claim 7 wherein the optically emissive device comprises an LED (light-emitting diode) operating in a non-visible light band and configured to illuminate the coating on the film.

9. The mounting apparatus of claim 5, wherein the coating when activated is configured to display a visible symbol that indicates that a problem exists with the image displayed on the PED display.

10. The mounting apparatus of claim 5, wherein the coating when activated is configured to display the visible symbol in a color that indicates that a problem exists with the image displayed on the PED display.

11. The mounting apparatus of claim 10, wherein the color is red and the symbol is an X.

12. The mounting apparatus of claim 5, wherein the coating when activated is configured to display text that indicates that a problem exists with the image displayed on the PED display.

13. The mounting apparatus of claim 1, wherein the PED comprises a general-purpose tablet computer or a smartphone.

14. The mounting apparatus of claim 1, further comprising a wireless interface module configured to communicate wirelessly with the PED using a wireless communication methodology employed by the PED to transfer data between the server and the PED.

15. The mounting apparatus of claim 1, further comprising a wireless charging module configured to transfer energy to the PED via wireless charging.

16. The mounting apparatus of claim 15, further comprising an energy storage module configured to store energy and provide stored energy to the wireless charging module.

17. A method in a mounting apparatus configured to mount a personal electronic device (PED) having a PED display in an aircraft flight deck and provide a visible indication on the PED display when a fault condition exists concerning the display of critical aeronautical information on the display, the method comprising:

transmitting an image of the PED display recorded by the optical sensor to a server;

activating, responsive to receipt of an enable signal from the server, an actuation source in the mounting apparatus to excite an actuatable covering on an optically transparent surface overlaid on the PED display;

exciting the actuatable covering to switch from an optically transparent first state to and optically emissive second state; and annunciating a message indicating that a problem exists with the image displayed on the PED display with the actuatable covering switched to the second state.

18. The method of claim 17, wherein annunciating a message comprises displaying a visible symbol that indicates that a problem exists with the image displayed on the PED display.

19. The method of claim 17, wherein annunciating a message comprises displaying text that indicates that a problem exists with the image displayed on the PED display.

20. A mounting adapter configured to facilitate the display of critical aeronautical information on a personal electronic device (PED) that is not certified for displaying critical aeronautical information, the mounting adapter comprising:

a base configured to receive the PED and to securely mount the PED in an aircraft cockpit;

a lid configured to encase the PED within the base, the lid including a film configured to be overlaid on a PED display, the film being arranged on the lid in a way that provides physical contact with the PED display when the lid is closed to allow for touch-gesture control and display action of the PED, the film including a coating that is optically active in the presence of an excitation signal from an excitation source wherein upon application of the excitation signal the coating is configured to change state from normally optically transparent to optically emissive or opaque in a way that is visible in multiple lighting conditions encountered on an aircraft flight deck, the lid further including a camera aimed in a manner to provide a view of the PED display and configured to record an image of the PED display, the lid further including an excitation source comprising an optically emissive device trained on the film and configured to illuminate the optically reactive elements in the coating and activate the optically emissive qualities of the coating; and and an interface configured to transmit image information from the camera to a server and configured to transmit one or more signals from the server to the optically emissive device to command the optically emissive device to illuminate the coating to annunciate fixed or variable information as encoded in the coating.

\* \* \* \* \*